United States Patent [19]

Uehara et al.

[11] Patent Number: 4,716,063

[45] Date of Patent: Dec. 29, 1987

[54] INFORMATION RECORDING DISK

[75] Inventors: Haruo Uehara, Yokohama; Hiroshi Omata, Kawasaki, both of Japan

[73] Assignee: Canon Kabushiki Kaisha, Tokyo, Japan

[21] Appl. No.: 789,837

[22] Filed: Oct. 21, 1985

[30] Foreign Application Priority Data

Oct. 23, 1984 [JP] Japan ................................ 59-223714

[51] Int. Cl.$^4$ .......................... C08G 75/04; G11B 7/24

[52] U.S. Cl. .................................... 428/65; 428/424.4; 428/448; 428/694; 428/900; 427/164; 369/288; 346/135.1; 430/945

[58] Field of Search ..................... 427/164; 428/64, 65, 428/694, 900, 448, 424.4; 430/945; 369/288, 13; 365/122; 360/131, 135; 346/135.1

[56] References Cited

U.S. PATENT DOCUMENTS 4,342,863 8/1982 Hohokabe et al. ................. 528/246

4,450,553 5/1984 Holster et al. ...................... 369/288

4,456,659 6/1984 Suda et al. .......................... 428/447

FOREIGN PATENT DOCUMENTS 56857 5/1981 Japan .

116002 9/1981 Japan .

180679 10/1983 Japan .

193924 11/1984 Japan .

*Primary Examiner*—George F. Lesmes

*Assistant Examiner*—William M. Atkinson

*Attorney, Agent, or Firm*—Fitzpatrick, Cella, Harper & Scinto

[57] ABSTRACT

An information recording disk has a transparent support substrate and a transfer layer formed thereon using a stamper. The transfer layer comprises a precursor having as major components a cycloacetal compound having at least two polymerizable unsaturated groups, a compound having at least two mercapto groups, and an acrylic ester and/or methacrylic ester.

6 Claims, 5 Drawing Figures

INFORMATION RECORDING DISK

BACKGROUND OF THE INVENTION

1. Field of the Invention

The present invention relates to an information recording disk such as an audio disk, a video disk and an optical or optomagnetic disk as a data file or buffer and, more particularly, to a disk which may be manufactured by transferring an information pattern to a support substrate of glass, plastic or the like by means of a mold called a stamper.

Further, the present invention relates to an information recording disk in which a resin forming an information transferring layer is a liquid precursor and the liquid precursor may be cured by applying light, heat or the like to form a cured resin layer integrated with a support having a transferred information pattern.

2. Description of the Prior Art

A record disk is well known as a conventional disk-like information medium. A stamper having a helical groove is used as a mold, and vinyl chloride is molded by injection or compression molding to manufacture records in mass production lines. The resin used in the manufacture of records is of a high molecular weight, and the high polymer resin is heated and melted for molding. In this process, the following problems are present: the flowability of resin melt is low; a thermal decomposition gas corrodes the stamper since molding requres a high temperature and a high pressure; the flow of resin melt or dust under a high pressure damages the surface pattern of the stamper; and the molecular orientation is distorted due to a heating/cooling cycle and a melt flow. Injection or compression molding has an advantage in mass production, but is not always advantageous for manufacturing disks with a high recording density.

Information recording disks such as audio, video and data processing optomagnetic disks have been commercially available in recent years. Typical structures of these disks will be described below.

FIG. 1 shows an example of an information recording disk. A transparent support substrate is made of plastic, glass or the like. Signal grooves or pits are formed in the surface of the support substrate 1. A reflecting layer 2 is formed on the support substrate 1 by depositing aluminum or the like thereon. The reflecting layer 2 is covered with a protective layer 3. An optical path 4 indicates a path for a signal read beam.

FIG. 2 shows another example of a two-side information recording disk. In this disk, two-side recording can be performed since the protective layers 3 of two information recording disks of FIG. 1 are adhered through an adhesive layer 5.

FIG. 3 shows still another example of a capacitive information recording disk. The disk comprises a support substrate 1, conductive layers 6 constituted of a thin metal film and dielectric layers 7

FIG. 4 shows an example of an optomagnetic information recording disk. Tracking grooves are formed in a support substrate 1 made of a transparent plastic, glass or the like. A magnetic recording layer 8 is formed by sputtering or the like. A protective layer 3 is formed on the magnetic recording layer 8.

FIG. 5 shows another example of an information recording disk as a two-side optomagnetic disk prepared by adhering the two single-side optomagnetic disks of FIG. 4 so that writing reading operation can be performed from the both surfaces.

These information recording disks require a particularly higher pattern shaping precision since the information recording disks have much higher recording density than conventional record disks. In order to manufacture these information recording disks, a molding method different from that used in manufacturing record disks is adapted and called a 2P or photo-polymer method. According to this method a liquid photo-setting resin is injected between a disk substrate and a stamper and is cured with light to transfer a pattern of the stamper, thereby preparing an integral structure consisting of the substrate and the pattern layer. Since the non-cured resin is a liquid having a relatively low molecular weight, it can be poured into the mold at atmospheric pressure. In addition, flowability of the resin is so good that the resin can be injected into the minute portions of the mold to obtain a replica with high precision. The molecular orientation due to flow of the resin does not substantially occur. Therefore, an information recording disk free from optical anisotropy can be fabricated.

Unlike in record disk fabrication, the stamper is not damaged due to molding at a high temperature and a high pressure. Ultraviolet curing provides a high reaction rate and is suitable for mass production. Heretofore, and acrylic acid ester or mothacryic acid ester compound has been used as a material for the transfer layer. This is mainly because the compound described above has proper properties to be polymerized and cured by irradiation with an ultraviolet ray for a short period of time. Furthermore, the compound is amorphous, has a small optical anisotropy and is convenient for an optical reading means.

When such an acrylic resin is used, however, there is not any acrylic resin capable of satisfying conditions that a replica, i.e., a transfer layer. can be easily released from the stamper and at the same time, the transfer layer has good adhesion to the support substrate, since easy release of the transfer layer from the stamper contradicts its good adhesion to the support layer.

SUMMARY OF THE INVENTION

It is a principal object of the present invention to provide an information recording disk using a transfer layer resin having good interface adhesion between a support substrate and a transfer layer and high pattern transfer precision.

It is another object of the present invention to provide an information recording disk which has high mechanical strength and surface hardness and is not liable to be damaged.

In order to achieve the above and other objects of the present invention, there is provided an information recording disk prepared such that a liqid resin precursor is held between an information recording disk mold and a transparent support substrate and is cured to form a resin layer integrally with the transparent support substrate, and the information pattern on the mold is tranferred to the resin layer, characterized in that the resin precursor used as the transfer layer comprises, as major components, a cycloacetal compound having at least two polymerizable unsaturated groups, a compound having at least two marcapto groups, and an acrylic ester and/or methacrylic ester.

DESCRIPTION OF THE PREFERRED EMBODIMENTS

Figure 1:
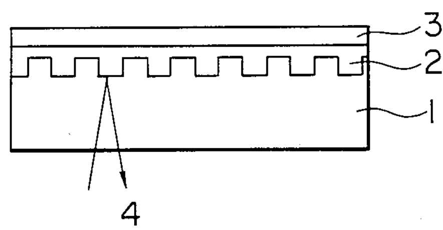
FIG. 1 is a cross sectional view of an information recording disk.
Figure 4:
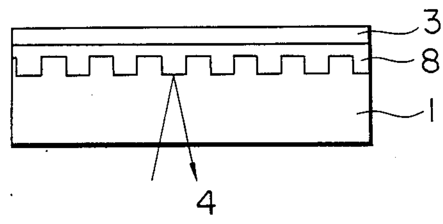
FIG. 4 is a cross sectional view of an optomagnetic information recording disk.
Figure 2:
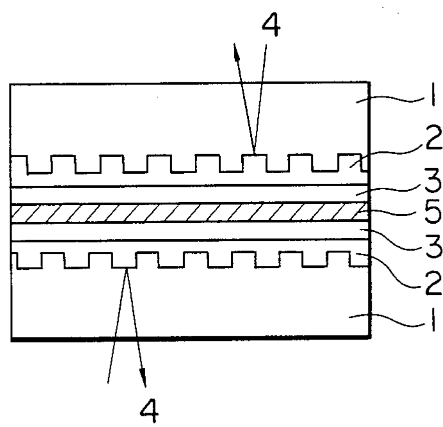
FIG. 2 is a cross sectional view of a twoside information recording disk made of two information recording disks of FIG. 1 adhored to each other.
Figure 5:
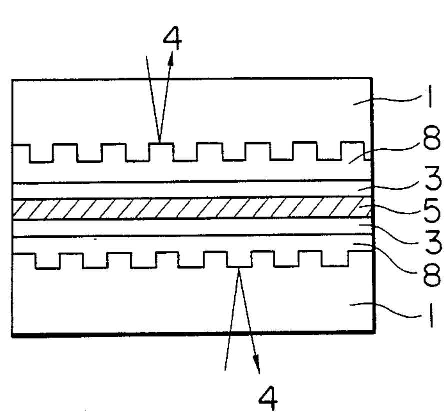
FIG. 5 is a cross sectional view of a disk constituted of two information recording disks of FIG. 4 adherod to each other and capable of writing and reading from the both surfaces.
Figure 3:
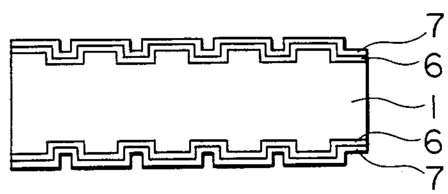
FIG. 3 is a cross sectional view of a capacitive information recording disk.

The cycloacetal compound as the first component according to the present invention has at least two unsaturated cycloacetal structures per molecule. The unsaturated cycloacetal structure has a polymerizable unsaturated group and can be represented by the following formula;

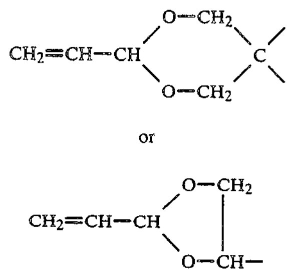

The cycloacetal compound is exemplified by diallylidenepentaerythritol or triallylidenesorbitol. The cycloacetal compound can be selected from various derivatives which are derived from reactions between these compounds with a hydroxyl group, mercapto group, isocyanate group, carboxy group, amino group or the like and each of which has two cycloacetal groups per molecule. The second component comprises a compound having at least two mercapto groups and is exemplified by dipentenedimercaptan, ethylcyclohexyldimercaptan, 1,6-hexanedimercaptan and the like. The second component may also be dimercapto compounds prepared by modifying mercapto compounds having a carboxy group by esterification or the like, such as pentaerythritol tetramercaptoacetate and the like.

An acrylic or methacrylic ester as the third component may be monoacrylate such as hydroxylethylacrylate, methoxydiethylene-acrylate and the like or methacrylate equivalent thereto; polyol polyacrylate such as polyethylene glycol diacrylate, polypropylene glycol diacrylate and the like, or dimethacrylate equivalent thereto, or a mixed ester compound part of which is methacrylate; polyacrylate or polymethacrylate of polyol using, as a starting material, polyhydric alcohol of at least trifunctional structure, or a mixed ester of acrylic acid and methacrylic acid e.g., polyacrylate derived from trimethylolpropane propylene oxide modification; polyacrylate or polyester derived from acid and alcohol of at least a bifunctional structure, or a compound obtained by substituting part or all of polyacrylate of polyester with methacrylate: and so-called epoxy acrylates or urethane acrylate including an epoxy oligomer or isocyanate in the molecular structure, or a compound obtained by substituting part or all of epoxy or urethane acrylate with methacrylate.

The component ratio of the compositions is properly selected taking into consideration the viscosity of the mixture, adhesion property between the cured mixture and the corresponding substrate or stamper, hardness of the cured mixture and the like. The content of the third component is about 30 to 300 parts by weight based on 100 parts by weight of the sum of the first and second components. The mixture is liquid and is poured between the mold and the substrate by a proper means. The liquid mixture is then cured by ultraviolet radiation, heating or the like. When the mixture is cured by ultraviolet rays, a photopolymerization initiator is dissolved in the liquid mixture and is examplified by benzophenone, benzoin ethyl ether, diethoxyacetophenone, benzyldimethylketal, and 2-hydroxy-2-methylpropiophenone. The amount of the initiator is several percent by weight or less based on the precursor. When thermal polymerization is performed, a polymerization catalyst such as di-tert-butyl peroxide, benzoyl peroxide, azobisisobutylonitrile, benzenediazonium chloride and the like. The amount of the thermal polymerization catalyst is substantially the same as that of the photopolymerization initiator.

The support substrate for transferring is preferably composed of a plastic substrate such as an acrylic substrate, a polycarbonate substrate, a styrene substrate and the like as well as a glass substrate. In order to improve adhesion between the support substrate and the transfer resin layer, the surface of the support substrate which is brought into contact with the transfer resin layer may be effectively treated with a silane coupling agent. The silane coupling agent can be selected from vinyltrimethoxysilane, vinyltriethoxysilane, vinyltris ($\beta$-methoxyethoxy) silane, $\gamma$-methacryloxypropylmethoxysilane. $\gamma$-mercaptopropyltrimethoxysilane, and $\beta$-mercaptethyltriethoxysilane. The silane coupling agent is dissolved to prepare a 1 to 2% by weight solution in methanol, ethanol, or a solvent mixture thereof with water. The resultant solution is uniformly applied to the surface of the substrate by a spinner or the like to form a thin film. The coating may be heated as needed.

A mold having a metal surface layer is normally used. For example, a mother board with grooves or pits is obtained by forming grooves or pits on a glass plate by a microlithographic technique, and forming an Ni layer by electroplating on the patterned surface of the glass plate by electroforming. The patterned Ni layer is removed from the mother board to prepare a mold having the metal surface. Cr may be plated on the surface of the Ni layer as needed. In order to effectively release the resin layer from the surface of the mold when the precursor is brought into contact with the support substrate, the stamper surface may be treated with a fluorine-based surfactant.

The glass support substrate having the surface treated with a silane coupling agent is overlaid on the Ni-electroformed mold through a spacer having a proper thickness. The precursor is injected in a space defined by the substrate, the stamper and the spacer. In this case, in order to guarantee flatness of the mold, the Ni layer is preferably backed by a flat metal or glass plate. Care must be taken not to form bubbles in the precursor when the precursor is injected in the space. An assembly of the stamper, the support substrate and the precursor therebetween is maintained horizontal. The assembly is irradiated with ultraviolet rays from the support substrate side. Alternatively, when thermal polymerization is performed, a heating means is used to increase the temperature of the whole assembly, thereby curing the precursor. After the resin is completely cured, the support substrate is released from the mold and the resin layer sufficiently adhered to and integrated with the support substrate can be prepared. The resin layer has prescribed grooves or pits. In this manner, the disk can be repeatedly manufactured, and the stamper can be repeatedly used.

EXAMPLE 1

A silane coupling agent was coated by a spinner on one surface of a flat glass plate and dried. The glass plate had a diameter of 200 mm and a thickness of 1.1 mm and a circular hole with a diameter of 30 agent was γ-methacryloxypropy trimethoxysilane (trade name: A-174 available from Nippon Unicar) and was used as an about 2% by weight methanol solution. An Ni stamper had 1-μm wide, 0.07 μm deep concentric grooves at intervals of 1 μm. The stamper was backed by a 10 mm thick flat aluminum plate through an epoxy adhesive. The resulting assembly was kept horizontally and the grooved surface of the stamper faced upward. A 75-μm thick Teflon ring spacers were placed on the outer peripheral portion of the stamper and the inner peripheral portion corresponding to the glass plate central hole. A resin precursor was poured between the stamper and the spacers, and the glass plate was carefully placed on the spacer so as not to form bubbles in the precursor. The spacer portions at the outer and the inner peripheral portions were clamped by the clips. The resin precursor was prepared as shown below. A diester acrylate monomer, 701-A (trade name, available from Shin-Nakamura Kagaku Kogyo K.K.) was added at a weight ratio of 1:2 to an unsaturated cycloacetal oligomer, Spirac T-502 (trade name, available from Showa Kobunshi K.K.) and 3% by weight of isopropyl ether was added as a photopolymerization initiator to the mixture. The precursor was irradiated with a 400-w physicochemical mercury lamp at a position about 10 cm away from the glass substrate for about 30 minutes to cure the precursor. Thereafter, the clips were removed, and a knife edge was at the spacer portion. The stamper was peeled off from the resin. The glass substrate was firmly adhered to the transfer layer. A rainbow-like interference color pattern was observed on the surface of the resultant transfer layer due to light interference of the concentric grooves.

The hardness of the surface of the transfer layer corresponded to 2B according to pencil hardness, JIS K 5401 and JIS S 6006. An adhesion between the glass substrate and the transfer layer was measured by a cross-out test. About 70% of grating regions of the transfer layer withstood a peeling test with an adhesive tape. A photomagnetic recording layer composed of Fe, Gd, Tb and Co was formed by sputtering on the surface of a replica prepared in the same manner as described above, and the resultant layer was able to provide sufficient performance in a read/write test.

EXAMPLES 2-19

Examples 2 to 19 are shown in Table 1. The procedure in each of Examples 2 to 19 was the same as that in Example 1 unless otherwise specified.

NK ESTER in Table 1 is a trade name for a monomer or oligomer of acrylic ester or methacrylic ester available from Shin Nakamura Kagaku K.K. The chemical structures of the NK ESTER's are given as follows.

NK ESTER 701-A is 2-hydroxy-1-acryloxy-3-methacryloxpropane; NK ESTER 1G is ethylene glycol dimethacrylate; NK ESTER 3G is triethylene glycol dimethacylate; NK ESTER U-4HA is 4-functional urethane acrylate; and NK ESTER EA-800 is epoxy acrylate. Benzoin isopropyl ether is a photopolymerization initiator; and benzoyl peroxide is a thermal polymerization initiator.

Polymerization conditions using benzoyl peroxide were 70° C. and 3 hours.

TABLE 1

| Material Evaluation Item | Example Nos. | | | | | | | | | | | | | | | | | |
|---|---|---|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 | 17 | 18 | 19 |
| SPIRAC T-502 | 1 | 2 | 1 | 1 | 1 | 1 | 1 | | | | | | | | | | 1 | |
| Diallylidenepentaerythritol | | | | | | | | 1 | 1 | 1 | 1 | 1 | 1 | 1 | 1 | 1 | | 1 |
| Pentaerythritoltetramercaptoacetate | | | | | | | | 1 | 1 | 1 | 1 | 1 | | | | | | 1 |
| Trimethylolpropanetrimercaptoacetate | | | | | | | | | | | | | 1 | 1 | 1 | 1 | | |
| NK ester 701-A | 1 | 1 | | | | | | 2 | 4 | | | | 2 | | | | 2 | 4 |
| NK ester 1G | | | 1 | | | | | | | | | | | | | | | |
| NK ester 3G | | | | 1 | | | | | | 2 | | | | 2 | | | | |
| Pentaerthritoltetraacrylate | | | | | 1 | | | | | | 2 | | | | 2 | | | |
| NK ester U-4HA | | | | | | 2 | | | | | | | | | | | | |
| NK ester EA-800 | | | | | | | 2 | | | | | 4 | | | | 2 | | |
| Benzoinisopropylether | 0.04 | 0.06 | 0.04 | 0.04 | 0.04 | 0.06 | 0.06 | 0.08 | 0.12 | 0.08 | 0.08 | 0.12 | 0.08 | 0.08 | 0.08 | 0.08 | | |
| Benzoylperoxide | | | | | | | | | | | | | | | | | 0.06 | 0.08 |
| Peelability From Stamper | | | | | | | Δ | | | | | Δ | | | | Δ | | |
| Pencil Hardness | 4B | 5B | 3B | 3B | B | 3B | 2B | 4B | 2B | 3B | 3B | B | 3B | 3B | 2B | 3B | 2B | 2B |
| Adhesion (Residual rate in cross-cut tape test) | 90 | 100 | 95 | 95 | 80 | 95 | 95 | 90 | 80 | 85 | 80 | 100 | 100 | 95 | 90 | 100 | 90 | 90 |
| Durability of Magnetic Film Write/Read Per- | good | good | good | good | good | good | good | good | good | good | good | good | good | good | good | good | good | good |

TABLE 1-continued

| Material Evaluation Item | Example Nos. | | | | | | | | | | | | | | | | | |
|---|---|---|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 | 17 | 18 | 19 |
| formance | | | | | | | | | | | | | | | | | | |

Mixing ratios in Table 1 represent mixing ratios by weight. Qualitative evaluations are worse in the order of O, Δ and X.

Peelability of the transfer film from the stamper is evaluated in the following manner:

O: The transfer layer can be easily peeled from the stamper when a razor-edge is slightly inserted therebetween.

Δ: After partial peeling of the transfer layer from the stamper occurs, a force must be applied to peel the layer from the stamper.

X: The transfer layer can not be peeled from the stamper and the glass substrate is broken.

The pencil hardness normally represents hardness with which the film is damaged. However, pencil hardness herein is evaluated when a scratch is formed on the surface of the transfer layer.

Adhesion test is conducted such that 11 lengthwise lines and 11 breadthwise lines at intervals of 1 mm are checkerwise drawn by cutting to form 100 squares and an adhesive tape is adhered to the 100 squares followed by peeling the tape. Adhesion strength is represented by the number of the transfer film squares remaining adhered to the substrate. The durability test of the magnetic film is made at 40° C. and 90% R.H. (relative humidity) after allowing to stand for 500 hours: O represents no failure; Δ represents that occurrence of small cracks: X represents formation of cracks and peeling of the layer from the substrate.

COMPARATIVE EXAMPLE

Tests in Comparative Examples 1 to 9 were made, as summarized in Table 2 below.

TABLE 2

| Material Evaluation Item | Comparative Example Nos. | | | | | | | | |
|---|---|---|---|---|---|---|---|---|---|
| | 1 | 2 | 3 | 4 | 5 | 6 | 7 | 8 | 9 |
| SPIRAC T-502 | 1 | | | | | | | | |
| Diallylidenepentaerythritol | | 1 | 1 | | | | | | 1 |
| Pentaerythritoltetramercaptoacetate | | 1 | | | | | | | |
| Trimethylolpropane-trimercaptoacetate | | | 1 | | | | | | |
| NK ester 701-A | | | | 1 | 1 | 1 | 1 | 1 | |
| NK ester 3G | | | | | 1 | | | | |
| Pentaerthritoltetraacrylate | | | | | | 1 | | | |
| NK ester U-4HA | | | | | | | 1 | | |
| NK ester EA-800 | | | | | | | | 1 | |
| Benzoinisopropylether | 0.02 | 0.04 | 0.04 | 0.02 | 0.04 | 0.04 | 0.04 | 0.04 | 0.02 |
| Peelability From Stamper | | | X | | | | | | X |
| Pencil Hardness | 6B | 6B | 6B | 4H | 3H | 4H | 2H | 2H | 6B |
| Adhesion (Residual rate in cross-cut tape test) | 100 | 100 | 100 | 20 | 0 | 0 | 0 | 0 | 70 |
| Durability of Magnetic Film | X | X | X | Δ | X | Δ | Δ | Δ | X |
| Write/Read Performance | poor | poor | poor | good | good | good | good | good | poor |

As may be apparent from Examples 1 to 19 and Comparative Examples 1 to 9, by using the material compositions of the present invention, good transfer can be performed such that the transfer layer can have excellent adhesion strength with the substrate and at the same time can be effectively peeled off. thereby preparing high-performance optomagnetic recording disks and optical recording disks.

What is claimed is:

1. An information recording disk prepared by a method wherein a liquid precursor is held between an information recording disk mold and a transparent support substrate and is cured to form a resin transfer layer integrally with the transparent support substrate, and the information pattern on the mold is transferred to the resin transfer layer, characterized in that the resin precursor used in the resin transfer layer comprises a major components a cycloacetal compound having at least two polymerizable unsaturated groups, a compound having at least two mercapto groups, and an acrylic ester and/or methacrylic ester.

2. The disk according to claim 1, wherein at least a surface of the support substrate which is in contact with the transfer resin layer is pretreated with a silane coupling agent.

3. The disk according to claim 1, wherein the amount of the acrylic ester and/or methacrylic ester ranges from 30 parts by weight to 300 parts by weight based on 100 parts by weight of the total of the cycloacetal compound and the compound having the mercapto groups.

4. The disk according to claim 1, wherein the resin precursor comprises an ultraviolet-curing resin.

5. The disk according to claim 1, wherein the resin precursor comprises a thermal-curing resin.

6. The disk according to claim 1, wherein an optomagnetic recording layer is formed on the transfer layer.

* * * * *

UNITED STATES PATENT AND TRADEMARK OFFICE

CERTIFICATE OF CORRECTION

PATENT NO. : 4,716,063

DATED : December 29, 1987

INVENTOR(S) : HARUO UEHARA, ET AL.

It is certified that error appears in the above-identified patent and that said Letters Patent is hereby corrected as shown below:

COLUMN 2

Line 29, "mothacryic" should read --methacrylic--.
Line 39, "layer." should read --layer,--.
Line 57, "liqid" should read --liquid--.
Lines 61-62, tranferred" should read --transferred--.
Line 67, "marcapto" should read --mercapto--.

COLUMN 3

Line 3, "cross sectional" should read --cross-sectional--.
Line 5, "cross sectional" should read --cross-sectional--.
Line 5, "twoside" should read --two-side--.
Line 7, "adhored" should read --adhered--.
Line 8, "cross sectional" should read --cross-sectional--.
Line 10, "cross sectional" should read --cross-sectional--.
Line 12, "cross sectional" should read --cross-sectional--.
Line 13, "adherod" should read --adhered--.
Line 23, "formula;" should read --formula:--.

COLUMN 4

Line 37, "." should read --,--.
Lines 38-39, "ß-mercaptethyltriethoxysilane." should read --ß-mercaptoethyltriethoxysilane.--.

UNITED STATES PATENT AND TRADEMARK OFFICE

CERTIFICATE OF CORRECTION

PATENT NO. : 4,716,063

Page 2 of 3

DATED : December 29, 1987

INVENTOR(S) : HARUO UEHARA, ET AL.

It is certified that error appears in the above-identified patent and that said Letters Patent is hereby corrected as shown below:

COLUMN 5

Line 18, "30 agent" should read --30 mm at the central portion therecf. The silane coupling agent--.
Line 19, "γ-methacryloxypropy trimethoxysilane" should read --γ-methacryloxypropyltrimethoxysilane--.
Line 24, "10 mm thick" should read --10 mm-thick--.
Line 40, "of isopropyl" should read --of benzoin isopropyl--.
Table 1, "Pentaerthritolte-" traacrylate should read --Pentaerythritolte--- traacrylate
Table 1, "Peelability From Stamper △ △ △" should read --Peelability From Stamper ○○○○○○○△○○○○○△○○○○△○○--
Table 1, "Durability of" Magnetic Film should read --Durability of Magnetic Film ○○○○○○○○○○○○○○○○○○○○○○○○--

COLUMN 6

Line 5, "was at" should read --was slightly inserted between the stamper and the resin at--.
Line 15, "cross-out" should read --cross-cut--.

UNITED STATES PATENT AND TRADEMARK OFFICE

CERTIFICATE OF CORRECTION

PATENT NO. : 4,716,063

DATED : December 29, 1987

INVENTOR(S) : HARUO UEHARA, ET AL.

It is certified that error appears in the above-identified patent and that said Letters Patent is hereby corrected as shown below:

COLUMN 6 (continued)

Lines 31-32, "methacryloxpropane;" should read --methacryloxypropane;--.
Line 34, "dimethacylate;" should read --dimethacrylate;--.

COLUMN 7

Table 2, "Pentaerthritoltetraacrylate" should read --Pentaerythritoltetraacrylate--.
Table 2, "Peelability From Stamper × ×" should read --Peelability From Stamper ○○×○○○○○×--

COLUMN 8

Line 9, "off." should read --off,--.
Line 20, "a" should read --as--.

Signed and Sealed this

Tenth Day of May, 1988

Attest:

DONALD J. QUIGG

Attesting Officer

Commissioner of Patents and Trademarks